(12) United States Patent
Fischer

(10) Patent No.: US 9,483,708 B2
(45) Date of Patent: Nov. 1, 2016

(54) METHOD AND APPARATUS FOR RECOGNIZING OBJECT REFLECTIONS

(71) Applicant: Robert Bosch GmbH, Stuttgart (DE)

(72) Inventor: Michael Fischer, Reichenbach/Fils (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/568,828

(22) Filed: Dec. 12, 2014

(65) Prior Publication Data

US 2015/0178588 A1    Jun. 25, 2015

(30) Foreign Application Priority Data

Dec. 19, 2013    (DE) .................. 10 2013 226 760

(51) Int. Cl.
*G06K 9/00*    (2006.01)
*G06K 9/46*    (2006.01)

(52) U.S. Cl.
CPC ......... *G06K 9/4661* (2013.01); *G06K 9/00791* (2013.01); *G06K 9/00818* (2013.01)

(58) Field of Classification Search
CPC .......... G06K 9/00818; G06K 9/4661; G06K 9/00791
See application file for complete search history.

(56) References Cited

U.S. PATENT DOCUMENTS

2013/0101161 A1*    4/2013    Faber .................. G01J 1/18
                                                382/103

* cited by examiner

*Primary Examiner* — Tom Y Lu
(74) *Attorney, Agent, or Firm* — Norton Rose Fulbright US LLP

(57) ABSTRACT

A method for recognizing an object reflection in at least one image generated by a camera of a motor vehicle includes: recognizing at least one first object candidate in the image; identifying at least one first reflection indicator as a function of the first object candidate; evaluating the first reflection indicator to analyze whether the first object candidate is an object reflection; and outputting an evaluation signal as a function of the evaluation, the evaluation signal characterizing the first object candidate as at least one of an object reflection and an object.

10 Claims, 5 Drawing Sheets

METHOD AND APPARATUS FOR RECOGNIZING OBJECT REFLECTIONS

BACKGROUND OF THE INVENTION

1. Field of the Invention

The present invention relates to a method for recognizing object reflections in at least on image that has been generated by a camera of a motor vehicle, to a corresponding apparatus, and to a corresponding computer program product.

2. Description of the Related Art

Object reflections occur in road traffic in various ways; for example, objects relevant to traffic, such as traffic signs, can be reflected from wet or icy road surfaces. It is also conceivable for reflections to occur from parts of the motor vehicle, for example the hood.

Reflections of this kind are presently taken into account in automotive engineering by checking whether light from the motor vehicle's own headlights is being reflected from objects and then being perceived by an onboard camera or by the driver. This involves the recognition of self-luminous objects and, in part, preventing the driver from being dazzled by headlights.

Reflections of objects from surfaces which result in double images are made up of an image of the object and of its object reflection on the image sensor. These have been regarded hitherto only as an undesired effect, an effort being made to recognize and discard the reflections in order to prevent recognition of incorrect objects.

BRIEF SUMMARY OF THE INVENTION

In light of the above, the present invention furnishes a method of the kind recited previously having the steps of: recognizing at least one first object candidate in the image; identifying at least one first reflection indicator as a function of the first object candidate; evaluating the first reflection indicator, analyzing whether the first object candidate is an object reflection; and outputting an evaluation signal as a function of the evaluation, such that the evaluation signal can characterize the first object candidate as an object reflection and/or as an object.

The novel method is based on the idea, known per se, of recognizing object reflections within an image acquired by the camera. It is assumed here that this type of reflection is, at least by day, independent of illumination by the motor vehicle, but that especially at night it can be assisted or indeed enabled at all by said illumination. What is essential here is that the light of the object reflection travels from the object indirectly to the camera, i.e. via a reflector such as reflective objects or buildings, a wet or icy roadway surface, or a reflective motor vehicle part.

In the recognizing step, firstly a first object candidate in the image is detected. For clarification: in the case of a double image, at least two object candidates would thus be present in the image. The object candidates are preferably recognized using conventional object detection algorithms. What now needs to be verified is whether the first object candidate represents an object reflection or the object itself.

For this purpose, in the identifying step at least one first reflection indicator is identified as a function of the first object candidate. The reflection indicator is an indication of whether the object candidate is an image of an object reflection or an image of the object itself. The specific embodiment of the reflection indicator depends on the evaluation strategy selected and on the physical correlations used in that regard.

In the evaluating step, the first reflection indicator is analyzed and a determination is made as to whether the object candidate is an object reflection. This can be done, for example, by comparing the first reflection indicator with predefined values from a database or with a threshold value.

In the subsequent step the evaluation signal is outputted. The evaluation signal contains an information item as to whether the first object candidate is the object reflection or the object.

It is advantageous here that the knowledge gained, in the method furnished, about the nature of the object candidate, i.e. object or object reflection, is available for further evaluations. In the simplest case an object reflection can be excluded from further analyses, in order thereby to save calculation time and preclude incorrect information and evaluations.

In a further embodiment of the invention the method has the additional steps of: recognizing at least one second object candidate in the image; identifying at least one second reflection indicator as a function of the second object candidate; evaluating the at least one second reflection indicator, analyzing whether the second object candidate is an object reflection, the first reflection indicator being compared with the second reflection indicator in order to evaluate the first reflection indicator and the second reflection indicator; and outputting the evaluation signal as a function of the evaluation, such that the evaluation signal can additionally characterize the second object candidate as an object reflection and/or as an object.

In this embodiment the procedure is similar to the previous method. A core idea here is that firstly, in addition to the first object candidate a second object candidate is detected so that the reflection indicators of the two object candidates can be compared with one another. This is advantageous in particular when reasonable pairings of object candidates can be found via additional parameters, one of the object candidates with high probability being an object and the other object candidate its object reflection. This yields the possibility of carrying out a relative analysis between the two object candidates using the exclusion principle. This has the particular advantage of being highly robust with respect to predefined and/or learned analysis data that would otherwise enable an evaluation of the reflection indicators. A particularly reliable and robust evaluation method is thereby furnished.

In a further embodiment, at least one geometric and/or color-related feature of the at least one object candidate is evaluated as a reflection indicator.

In this embodiment, shape and/or color is used as a reflection indicator. For example, color shadings, deformations, size, and/or angles within the object candidate that are typical of an object reflection can be identified for this purpose.

It is particularly preferred if a correlation is created between the first and the second object candidate as a function of their shape and color, in order to enable a relative analysis. It is thereby possible on the one hand to recognize the presence of double images and on the other hand to determine which of the object candidates is the object reflection and which of the object candidates is the object.

The geometric and/or color-related features are used in order to determine a similarity between the two object candidates using conventional image processing methods. Distortions and blurring of the object reflections can also be taken into account, as can mirror-inversion. Expressed graphically, when an object candidate is recognized and a mirror-inverted image of that object candidate is recognized as a second object candidate, a double image then exists. An association can be made particularly reliably when the mirror-inverted image of the object is located in a mirror axis and in a reflection plane, for example a roadway plane.

Object candidates can furthermore be checked for completeness, since object reflections as a rule depict only part of the object. This is the case, for example, when the object reflection is produced in a sharply demarcated reflective surface, for example in a puddle. All in all this results in an even more robust and more error-free concept for recognizing object reflections in an image.

In a further embodiment, a light characteristic of the at least one object candidate is evaluated as a reflection indicator.

In this embodiment an object reflection is recognized as a function of its light characteristic. A "light characteristic" can be understood, for example, as a polarization and/or brightness of the object candidate.

Due to physical circumstances, object reflections are as a rule partly polarized, i.e. a particularly large proportion of the light of the object reflection exhibits a common polarization. Using suitable filters, for example circular polarizing filters, it is possible to determine whether the object candidate has been imaged with unpolarized light or partly polarized light. This information regarding the polarization of the light enables a direct inference as to whether the object candidate is an object or an object reflection.

A brightness of the object candidate can be used as an additional or alternative light characteristic. Particularly brightly luminous object candidates can be recognized, for example, as self-luminous objects or as objects directly illuminated by the motor vehicle's headlights. It is possible to verify whether an object candidate is an object directly illuminated by the vehicle's headlights by additionally checking the switching state of the headlights. Object candidates that appear dark, conversely, can be classified as object reflections. It is particularly advantageous when a double image having an object candidate pairing is present, since the brighter of the two object candidates can be classified as an object and the correspondingly darker object candidate as an object reflection.

In a further embodiment, a relative motion of the at least one object candidate relative to the camera is evaluated as a reflection indicator.

This embodiment exploits the effect that because of the longer light path, object reflections appear to move more slowly relative to an observer than does the object itself.

In order to determine the relative speed, the object candidate must be detected in at least two images. The relative speed of the object candidate can then be identified, for example, from differences in size of the object candidate and from the time interval between the two images. The apparently slower relative speed of an object reflection results from the laws of optics. The principal influencing criteria here are: location and flatness of the reflective plane, for example the roadway surface; distance from the camera to the object; and height of the object with respect to the reflective plane. The relative speed can be identified particularly accurately in consideration of these parameters and laws.

This relative speed can be compared with the inherent speed of the motor vehicle. If the relative speed is appreciably lower, it is then to be assumed that an object reflection is involved.

It is also conceivable to compare relative speeds of two similar object candidates in a double image. The object candidate having the relative speed that comes closest to the inherent speed of the motor vehicle is with high probability the object, whereas the further object candidate can be classified as an object reflection.

It is particularly advantageous if multiple reflection indicators are used simultaneously or successively in order to recognize object reflections. The methods recited above can thus be applied together in order to enable plausibilization of the recognition of object reflections.

A further aspect of the invention relates to a method for ascertaining an ambient condition in a sensing region of a camera of a motor vehicle, having the steps of: recognizing object reflections using a method as recited in one of the preceding claims; ascertaining at least one reflection feature of at least one object reflection; ascertaining as a function of the reflection feature an ambient parameter that describes an ambient condition; and outputting the ambient parameter.

This aspect of the invention is based on the recognition that in the context of recognizing object reflections, information regarding the object reflection can be used to detect the ambient condition. An "ambient condition" is understood as the state of an ambient area in the region of the camera, being understood, for example, as the presence of objects, topographical information, road states, peripheral installations, and further environmental parameters.

This method is based preferably on the embodiments described previously for recognizing object reflections, firstly an object reflection being recognized.

A reflection feature of the recognized object reflection is then ascertained. This can be, for example, a physical parameter such as deformation, distortion, color, sharpness, dimensions, brightness, or reflectance.

In a further step, the ambient parameter is derived from the reflection feature on the basis of logical, empirical, or physical correlations. This ambient parameter is an indication of the ambient condition.

In a last step, the ascertained ambient parameter is outputted for further processing.

An advantage here is that object reflection is not, as in the existing art, merely for further analysis, but instead that the information regarding the object reflection is made usable for a driver. The consequence of this is an advantageous improvement in the use of calculation capacity thanks to utilization of the information.

In an embodiment of the method for ascertaining an ambient condition, a reflection location of a recognized object reflection is ascertained as a reflection feature.

In this embodiment the reflection location of the object reflection is identified, and from this an image region having elevated brightness can be derived. From this image region in turn, an ambient region having elevated brightness can be ascertained as an ambient parameter.

The "reflection location" is understood as the location at which the object reflection is actually located relative to the motor vehicle and/or to the camera. Alternatively or additionally, it is also conceivable to understand the "reflection location" as a region of the image in which the likeness of the object reflection is situated. Both definitions will be used together hereinafter, since typically they can be unequivocally converted mathematically into one another.

One advantage of knowing this ambient parameter is the possibility that an evaluation of the camera can be improved. On the one hand it is conceivable to discard the corresponding region for an evaluation in order to avoid errors that would occur if the object reflections were classified as objects. This is the case, for example, when an additional vehicle is traveling slowly in front of the own vehicle. In this case two motor vehicles following one another might incorrectly be recognized. It is advantageous in such a case if the object reflection of the preceding vehicle is discarded, so that safety-critical systems with regard to the own vehicle can be supplied with correct information.

A further possibility is in fact to evaluate the image region having elevated brightness, since this offers (especially at night) sufficient light for an evaluation. A general object recognition can consequently be improved in this region or in fact confined to this region. A reduction in calculation time results therefrom.

It is further conceivable for the image region to be given preference in the context of an object recognition operation, object candidates recognized therein being more preferably regarded as existent than supposedly recognized object candidates in more poorly illuminated regions. The result is improved and more reliable recognition of objects, in particular under difficult viewing conditions. For example, roadway markings that are recognized in regions brightened by object reflections can be more reliably classified than roadway markings in more poorly illuminated regions. It is also possible, for example, to preclude snowdrifts, which due to corresponding headlight illumination are recognizable only as stripes in the image, from being incorrectly recognized as lane markings.

A further possibility for utilization of this ambient parameter is preventing the driver from being dazzled by the object reflection. Here the reflected brightness of the object reflection can be sensed and evaluated as an additional reflection feature. With the aid of information regarding the ambient region having elevated brightness and regarding the actual reflected brightness, it is possible to ascertain, for example at night with the headlights on, whether a driver is being dazzled by the object reflection. Dazzling of the driver by the light of his or her own headlights can then be averted or at least mitigated by controlling the headlights as a function of the ambient parameter and the reflection features. Consideration must be given here to the fact that the degree of dazzling can be influenced not only by the reflection brightness and the ambient region, but also by an inherent motion of the reflective surface, for example a dynamic motion in the case of a puddle.

A further possibility for utilizing the ambient parameter consists in deliberately generating and controlling object reflections by way of the headlights, so that regions which otherwise cannot be illuminated by the headlights are brightened indirectly. An advantage here is better illumination of the vehicle's surroundings, and thus an improved ability to evaluate the vehicle's surroundings using the camera.

In a further embodiment of the method for ascertaining an ambient condition, an object location of an object that is pertinent to the recognized object reflection is ascertained, the ambient parameter being ascertained additionally as a function of the object location.

In this embodiment, in addition to the object reflection, the location of the object that is being reflected is ascertained. Evaluation of these two physically interconnected information items, i.e. the reflection location and the object location, allows further, more complex ambient conditions to be ascertained.

It is conceivable to ascertain as a function of this information a position of an auxiliary horizon as an ambient parameter. This can be ascertained by way of geometric calculations as a function of the reflection angle. A concatenation of non-moving objects reflected from the roadway, for example streetlights or traffic signs, is particularly suitable for this. The position of the auxiliary horizon is identified on the assumption that the auxiliary horizon is located at the center between the at least one reflected object and its pertinent object reflection. This assumption is especially valid in particular when the reflected object is far away from the motor vehicle and the surroundings are as flat as possible. This auxiliary horizon can be used particularly advantageously for controlling the headlights, or for virtual subdivision of the image for further image processing steps.

It is moreover conceivable to identify a roadway trajectory as an ambient parameter. This too can be ascertained by way of geometric calculations as a function of the reflection angle, a geometric analysis of the beam paths of the reflected light beams being carried out. A concatenation of non-moving objects reflected from the roadway, for example streetlights or traffic signs, is likewise particularly suitable for this. It is particularly advantageous if concatenations having equidistant objects are used, since particularly high-quality results are obtained therefrom.

It is moreover conceivable to identify a distance to the object as an ambient parameter. A prerequisite for this is the use of a double image from a mono camera, the imaged object and the object reflection being used, similarly to the case with a stereo camera, as two images having different acquisition angles. For this, the angle between the object and the sight axis, and the angle between the object reflection and the sight axis, as well as preferably the distance from the object reflection to the camera, must first be ascertained. The distance from the object to the camera can then be calculated using known concepts. An advantage here is that it becomes possible to identify distance using a mono camera, with no need for a stereo camera.

In a preferred embodiment, the hood or another body part of the motor vehicle that can be sensed by the camera is evaluated as a reflective surface. This has the advantage that they can very easily be recognized in the image, and are not illuminated by the vehicle's own headlights. In addition, they supply a relatively sharp object reflection due to the polished surface. A further advantage is that the geometry of the hood is known and can be taken into account when evaluating the object reflection. It is also conceivable here to back-calculate, based on the known geometry, a distortion of the object reflection generated by the hood. It is further conceivable to shape a hood correspondingly so that a reflective effect suitable for evaluation occurs; for example, reflections over a wide bandwidth of distances can be made visible by way of corresponding round areas of the hood, similarly to a converging lens.

It is moreover conceivable to recognize as an ambient parameter a masking of an object, if no object location is ascertainable. If only an object reflection is detected and if the pertinent object cannot be sensed, masking is to be assumed. This can be the case, for example, in the context of an oncoming vehicle that is driving in a hollow and is masked by a bridge, so that only reflections of the headlights can be sensed. This information can be used, for example, in order to preventively switch off a high-beam light.

In a further embodiment of the method for ascertaining an ambient condition, a reflection dimension of the recognized object reflection is ascertained as a reflection feature.

In this embodiment at least one dimension of the object reflection is ascertained. Provision is preferably additionally made to ascertain the pertinent dimension of the object itself, for example the height. Comparing these extents or dimensions of the object and of the object reflection makes it possible to identify a slope of the corresponding road segment as an ambient parameter. This too can be ascertained by geometric calculations as a function of the reflection angle, a geometric analysis of the beam paths of the reflected light beams being carried out. An advantage here is that information regarding the roadway trajectory can be ascertained very simply and economically.

In a further embodiment of the method for ascertaining an ambient condition, a reflection quality of the recognized object reflection is ascertained as a reflection feature.

In this embodiment, firstly a determination is made as to how well the object reflection reproduces the object. A geometric similarity between the object and the object reflection can be employed, for example, as an indication of this. An alternative indication is represented by a blur quotient, made up of a sharpness of the object in relation to the sharpness of the object reflection. Alternatively or additionally, a sharpness difference can also be calculated. Suitable indicators of the sharpness are, for example, a gradient of an object or of a light spot, and also the dimension or extent of the object or light spot. A general image blur for the entire image is averaged out by calculating such quotients.

By ascertaining the reflection quality it is possible, for example, to identify the degree of wetness of the roadway surface as an ambient parameter. A very wet roadway, with a thick layer of water, results in a particularly smooth surface and thus in little blur and great similarity between the object reflection and the object. Blurring, or a low degree of similarity, occurs only with pronounced wave formation. Pronounced wave formation can be compensated for, for example, by a mathematical wave formation model, in which context typical wave formation patterns can be identified and the degree of wetness can be identified or plausibilized.

The recognition of local water accumulations, for example puddles and water films, is in particular conceivable. As already discussed earlier, wet regions can detected very effectively. If individual sites having these reflective properties can be recognized in an otherwise non-reflective region, a preventive evasive action can be taken. For example, the motor vehicle can also be controlled as a function of this information in such a way that the motor vehicle does not drive through the puddle or the water film, for example in order not to spray water on passersby, not to soil the motor vehicle, or (in the case of larger water accumulations) not to limit one's own view as a result of sprayed water.

An additional check here as to whether a sidewalk is present in the vicinity of the water accumulation, or as to whether passersby have been recognized in the image, is optionally useful here. Local water accumulations are defined in particular by the fact that they are a clearly delineated and limited region in which a reflective surface is present. The outline of the water accumulation can thus be verified by way of a demarcating edge of the object reflection.

The reflection quality can furthermore be used in order to determine a slickness of the roadway as an ambient parameter. Very sharp and non-dynamic object reflections indicate a frozen roadway and thus slickness.

A further application of the reflection quality is the recognition of tracks in reflective surfaces as an ambient parameter. The effect exploited here is that a preceding vehicle interrupts the reflective medium with its tires, with the result that an object reflection is likewise interrupted. This can be the case, for example, in the context of snow, ice, and water layers. It is thereby possible, even with poor visibility, to follow in the track of a preceding vehicle or to warn as to ruts.

The information as to wetness or slickness can be used for timely warning of the driver, or also for lateral guidance intervention on the vehicle in order to drive around the corresponding locations in the roadway or to ascertain further advantageous trajectories, for example when cornering.

It is moreover conceivable to infer, as a function of the reflection quality, the surface quality of the pavement as an ambient parameter. The "surface quality" can be understood, for example, as the roughness, which in turn represents an indication of the motor vehicle's traction. With regard to the surface quality, a relative comparison of the reflection quality over time can in particular take place, the reflection qualities of multiple successive road segments being correlated with one another. Different regions of the pavement are compared and, for example, a change in the pavement is identified.

A further application of the reflection quality is identification of the boundaries of the drivable road region as an ambient parameter. Edges of reflection images are preferably ascertained here as the reflection quality. These indicate boundaries of the paved region, since peripheral installations that are usually non-reflective are present outside the paved region.

With regard to all the aforesaid, it is conceivable in principle for the evaluation of object reflections from the roadway to be supplemented with an additional object reflection from the bodywork of the motor vehicle, in particular the hood. This is advantageous when object reflections from the road surface are locally absent, for example in a context of non-reflective (e.g. dry) locations on the roadway. In these cases consideration can alternatively or temporarily be given to the object reflection from the bodywork.

It is furthermore conceivable to implement a detection of condensation or dirt on the panel in front of the camera. A prerequisite for this is knowledge regarding an object reflection whose existence is obligatory, for example the object reflection from a mirror-reflective hood, at night, of a self-luminous traffic sign in a specific position with regard to the camera. If the corresponding object that would obligatorily need to generate the object reflection is recognized by the camera, and if no object reflection is simultaneously detected, soiling of the camera or of the panel in front of the camera is to be assumed.

Also advantageous is an apparatus that is embodied to carry out the method in accordance with one of the embodiments described above.

Also advantageous is a computer program product having program code which can be stored on a machine-readable medium such as a semiconductor memory, a hard drive memory, or an optical memory and is used to carry out the method in accordance with one of the embodiments described above when the program product is executed on a computer or on an apparatus.

DETAILED DESCRIPTION OF THE INVENTION

Figure 1:
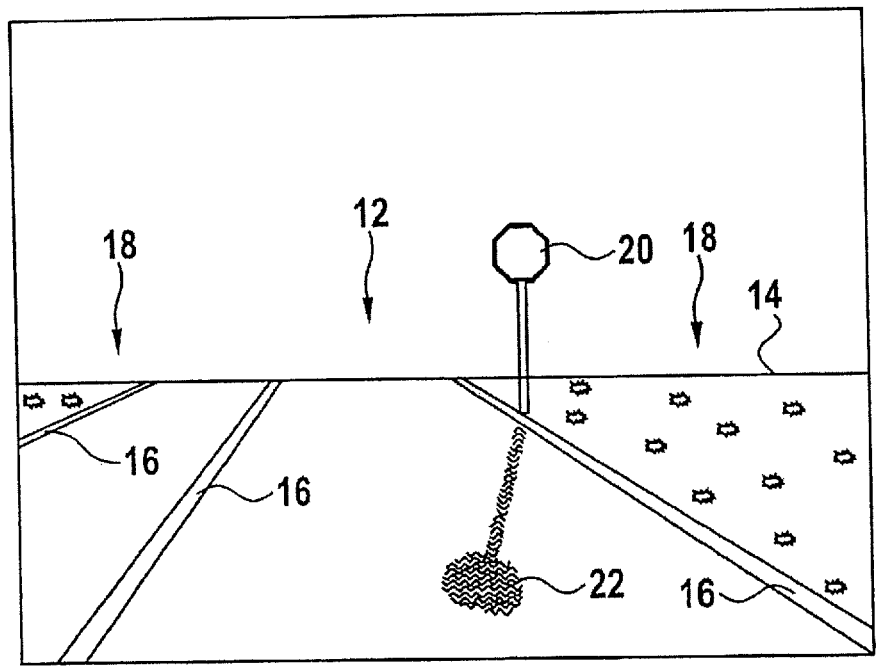
FIG. 1 is an image from a camera, with an object reflection.

In the description below of favorable exemplifying embodiments of the present invention, identical or similar reference characters are used for the similarly functioning elements depicted in the various Figures, said elements not being described more than once.

FIG. 1 shows an image 10 that has been acquired by a camera in a motor vehicle. Image 10 shows a typical scene viewed from a motor vehicle, and serves for clarification of the method according to the present invention. Depicted within image 10 is a road segment 12 that is delimited by a horizon 14. Road segment 12 has three road markings 16. Road segment 12 is moreover bounded laterally by a peripheral installation 18. Peripheral installation 18 is a non-reflective region that is made up of plants. A road sign 20, which is reflected on road segment 12, is shown as an object candidate. This results in an object reflection 22 that likewise represents an object candidate.

Figure 2:
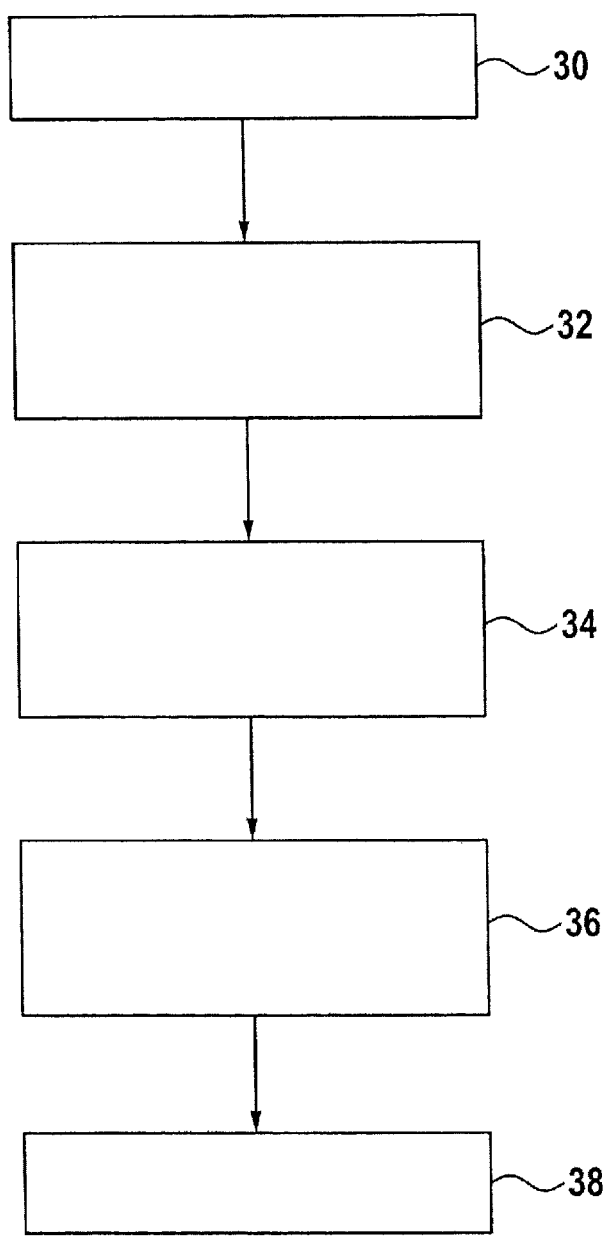
FIG. 2 is a flow chart of a first exemplifying embodiment of the method for recognizing object reflections.

FIG. 2 is a flow chart of a first exemplifying embodiment of the method for recognizing object reflections.

In a step 30, firstly an image 10 is received by a camera and read in.

In a further step 32, a first object candidate 22 is recognized using image analysis algorithms.

Then, in a step 34, a first reflection indicator is identified as a function of first object candidate 22.

The first reflection indicator is then evaluated in a step 36, a determination being made as to whether first object candidate 22 is object reflection 22 or whether object candidate 22 is actually object 20.

An evaluation signal is then outputted for further processing in a step 38. The evaluation signal contains an information item as to whether the first object candidate is now an object reflection or the object.

Figure 3:
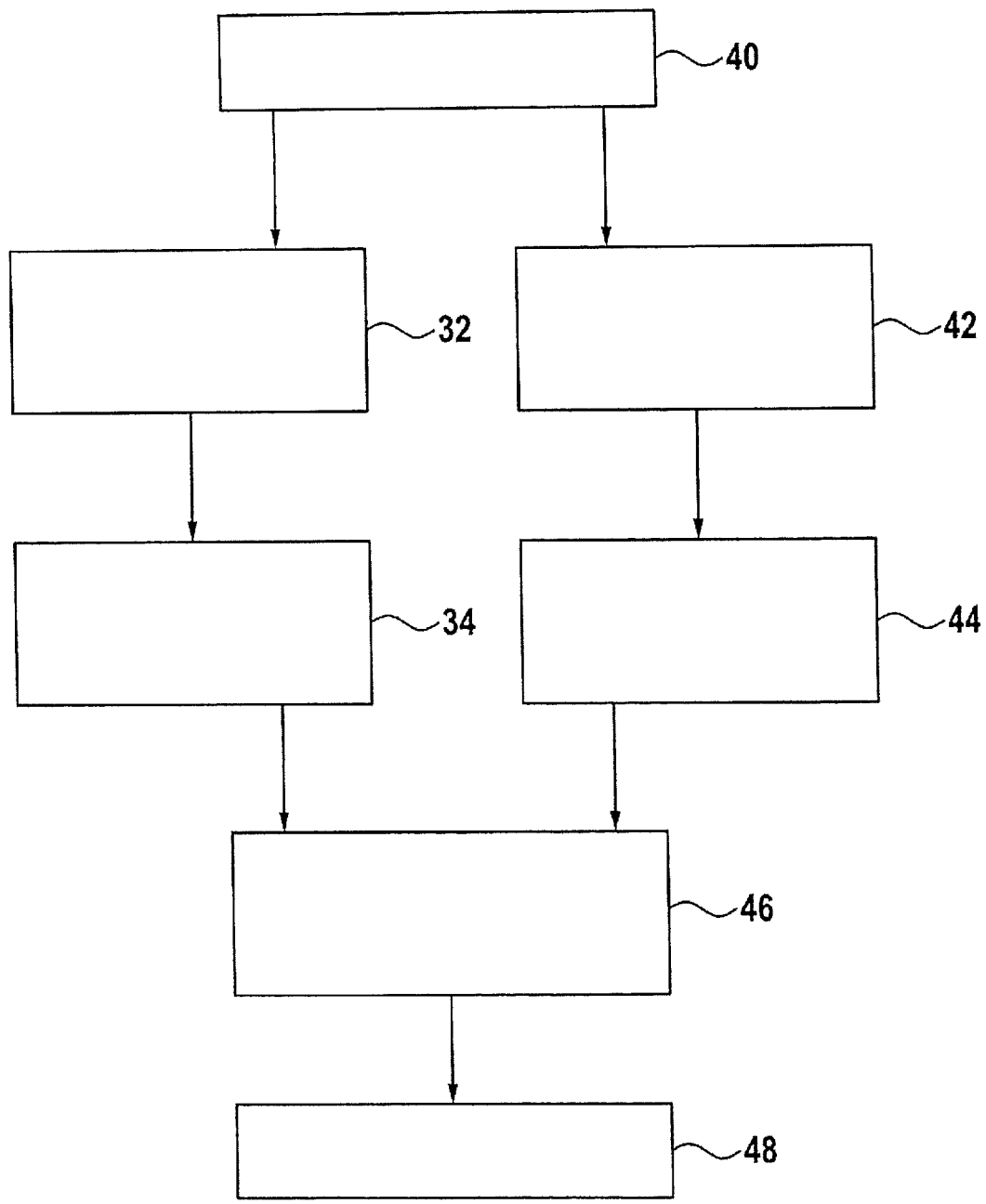
FIG. 3 is a flow chart of a second exemplifying embodiment of the method for recognizing object reflections.

FIG. 3 is a flow chart of a second exemplifying embodiment of the method for recognizing object reflections. This second exemplifying embodiment corresponds in principle to the first exemplifying embodiment, identical steps being labeled with identical reference numbers.

In a step 40, image 10 is firstly received by the camera and read in. Image 10 contains two object candidates 20 and 22. Image 10 is accordingly conveyed both to step 32 and to a further step 42.

In step 42, second object candidate 20 is recognized using image analysis algorithms.

Then, in a step 44, a second reflection indicator is identified as a function of second object candidate 20.

In a step 46, the first reflection indicator and the second reflection indicator are received and compared with one another. Depending on the comparison between the first reflection indicator and the second reflection indicator, a determination is made that first object candidate 22 is an object reflection 22 and that second object candidate 20 is an object 20.

In the concluding step 48, an evaluation signal is outputted for further processing. The evaluation signal contains information as to whether object candidates 20, 22 are now object reflections 22 or objects 20.

Figure 4:
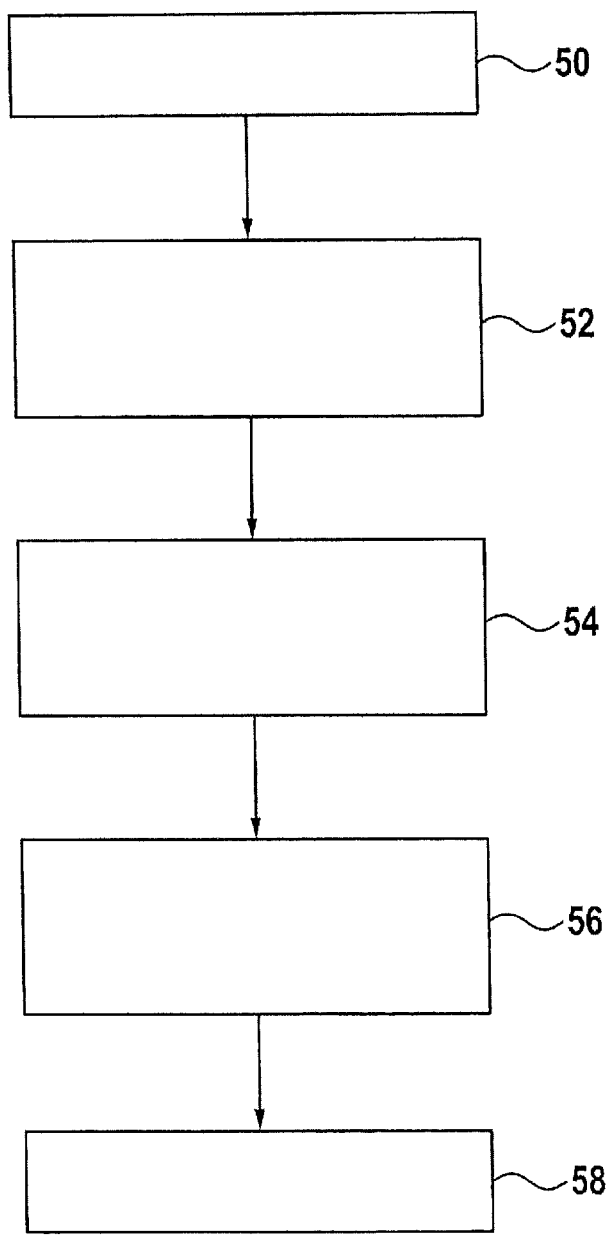
FIG. 4 is a flow chart of a method for ascertaining an ambient condition.

FIG. 4 is a flow chart of a method for ascertaining an ambient condition.

In a step 50, object reflections are recognized using a method described in FIG. 2 or 3.

In a further step 52, a reflection feature is ascertained from at least one object reflection that was recognized in step 50.

In a further step 54, an ambient parameter is ascertained as a function of the reflection feature. The ambient parameter describes the ambient condition, for example a slope or a road state.

In a further step 56, the ambient parameter is outputted for further processing.

In a concluding step 58, the ambient parameter is further processed, for example in order to inform or warn the driver or in order to control the vehicle.

Figure 5:
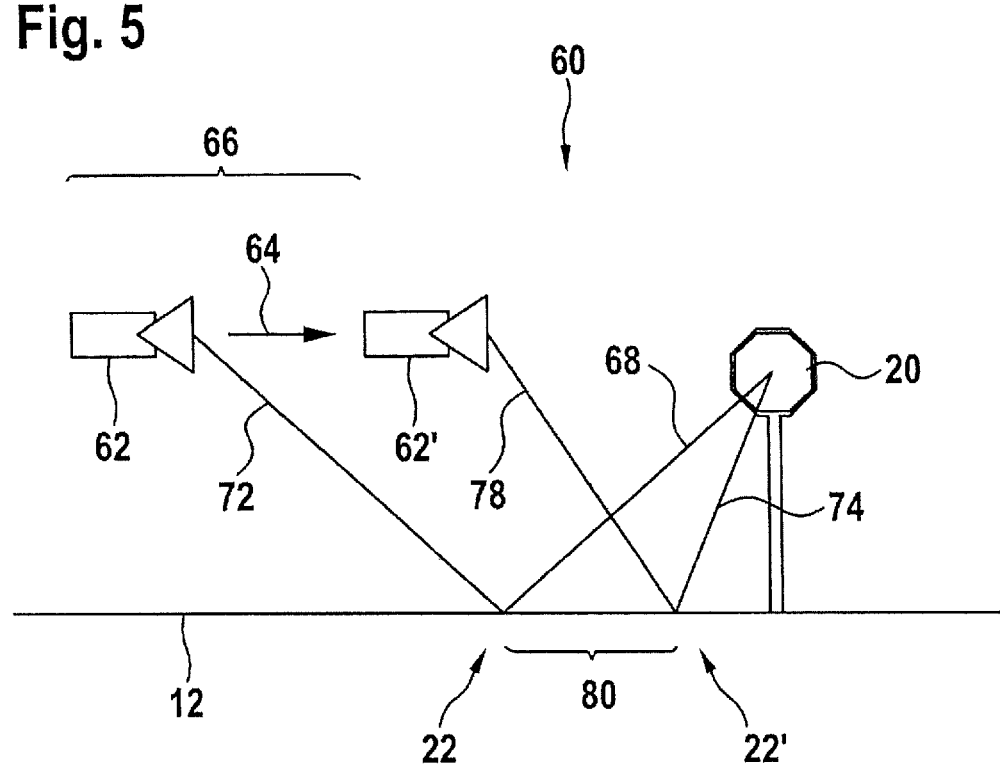
FIG. 5 schematically depicts the conditions for identifying a relative speed of an object reflection.

FIG. 5 shows a schematic driving scene 60 as well as the conditions for identifying a relative speed of an object reflection 22, 22'.

A camera 62 is disposed in a motor vehicle (not depicted). Said camera moves at an inherent speed in the direction of arrow 64 until it reaches the position of camera 62'. A distance 66 is thereby traveled.

Object 20 is reflected from roadway 12 as object reflection 22. A light beam 68 proceeds from object 20 and strikes roadway 12, where light beam 68 is reflected and proceeds further as light beam 72 to camera 62.

In corresponding fashion, in position 62' a light beam 74 from object 20 is reflected via roadway surface 12. This yields object reflection 22', which is perceived via a light beam 78 by camera 62'.

It is easy to recognize that because of the indirect light beams, a distance 80 between object reflections 22, 22' is smaller than distance 66. A sensed relative speed of object reflection 22 is accordingly also lower than the inherent speed with regard to object 20.

Objects 20 can thus be distinguished from object reflections 22 by way of the inherent speed and the relative speed.

The exemplifying embodiments described and shown in the Figures are selected merely by way of example. Different exemplifying embodiments can be combined with one another entirely or with regard to individual features. An exemplifying embodiment can also be supplemented with features of a further exemplifying embodiment.

Method steps according to the present invention can furthermore be executed repeatedly, and in a sequence other than the one described.

If an exemplifying embodiment encompasses an "and/or" linkage between a first feature and a second feature, this is to be read to mean that the exemplifying embodiment according to one embodiment has both the first feature and the second feature, and according to a further embodiment has either only the first feature or only the second feature.

What is claimed is:

1. A method for recognizing an object reflection in at least one image generated by a camera of a motor vehicle, comprising:
   recognizing at least one first object candidate in the image;
   identifying at least one first reflection indicator as a function of the first object candidate;
   evaluating the first reflection indicator to determine whether the first object candidate is an object reflection;
   outputting an evaluation signal as a function of the evaluation, wherein the evaluation signal characterizes the first object candidate as at least one of an object reflection and an object;
   recognizing at least one second object candidate in the image;
   identifying at least one second reflection indicator as a function of the second object candidate;

evaluating the at least one second reflection indicator to determine whether the second object candidate is an object reflection, wherein the evaluations of the first and second reflection indicators include comparing the first reflection indicator with the second reflection indicator; and outputting the evaluation signal as a function of the evaluations of the first and second reflection indicators, wherein the evaluation signal additionally characterizes the second object candidate as at least one of an object reflection and an object.

2. The method as recited in claim 1, wherein at least one of a geometric and color-related feature of at least one of the first and second object candidates is evaluated as a reflection indicator.

3. The method as recited in claim 2, wherein a light characteristic of at least one of the first and second object candidates is evaluated as a reflection indicator.

4. The method as recited in claim 1 to 3, wherein a relative motion of at least one of the first and second object candidates relative to the camera is evaluated as a reflection indicator.

5. A method for ascertaining an ambient condition in a sensing region of a camera of a motor vehicle, comprising:
recognizing object reflections in at least one image generated by a camera of a motor vehicle, by:
recognizing at least one first object candidate in the image;
identifying at least one first reflection indicator as a function of the first object candidate;
evaluating the first reflection indicator to determine whether the first object candidate is an object reflection; and
outputting an evaluation signal as a function of the evaluation, wherein the evaluation signal characterizes the first object candidate as at least one of an object reflection and an object;
ascertaining at least one reflection feature of the at least one object reflection;
ascertaining as a function of the reflection feature an ambient parameter describing an ambient condition, wherein the ambient condition describes a characteristic of a second object; and
outputting the ambient parameter.

6. The method as recited in claim 5, wherein a reflection location of the at least one object reflection is ascertained as the at least one reflection feature.

7. The method as recited in claim 6, wherein an object location of an object associated with the at least one object reflection is ascertained, the ambient parameter being ascertained additionally as a function of the object location.

8. The method as recited in claim 6, wherein a reflection dimension of the at least one object reflection is ascertained as an additional reflection feature.

9. The method as recited in claim 6, wherein a reflection quality of the at least one object reflection is ascertained as an additional reflection feature.

10. A non-transitory, computer-readable data storage medium storing a computer program having program codes which, when executed on a computer, perform a method for recognizing an object reflection in at least one image generated by a camera of a motor vehicle, the method comprising:
recognizing at least one first object candidate in the image;
identifying at least one first reflection indicator as a function of the first object candidate;
evaluating the first reflection indicator to determine whether the first object candidate is an object reflection;
outputting an evaluation signal as a function of the evaluation, wherein the evaluation signal characterizes the first object candidate as at least one of an object reflection and an object;
recognizing at least one second object candidate in the image;
identifying at least one second reflection indicator as a function of the second object candidate;
evaluating the at least one second reflection indicator to determine whether the second object candidate is an object reflection, wherein the evaluations of the first and second reflection indicators include comparing the first reflection indicator with the second reflection indicator; and
outputting the evaluation signal as a function of the evaluations of the first and second reflection indicators, wherein the evaluation signal additionally characterizes the second object candidate as at least one of an object reflection and an object.

* * * * *